United States Patent
Lindwer et al.

(10) Patent No.: US 7,210,140 B2
(45) Date of Patent: Apr. 24, 2007

(54) SOFTWARE SUPPORT FOR VIRTUAL MACHINE INTERPRETER (VMI) ACCELERATION HARDWARE

(75) Inventors: Menno Menassche Lindwer, Eindhoven (NL); Selim Ben-Yedder, Gagny (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 846 days.

(21) Appl. No.: 10/247,913

(22) Filed: Sep. 20, 2002

(65) Prior Publication Data
US 2003/0061254 A1    Mar. 27, 2003

(30) Foreign Application Priority Data
Sep. 25, 2001    (EP)    ............................. 01402455

(51) Int. Cl.
*G06F 9/45*    (2006.01)
(52) U.S. Cl. .................. 717/158; 717/136; 717/139
(58) Field of Classification Search ............. 717/136, 717/139
See application file for complete search history.

(56) References Cited

U.S. PATENT DOCUMENTS 4,253,145 A * 2/1981 Goldberg ................. 703/21
6,292,883 B1 * 9/2001 Augusteijn et al. ......... 712/209
6,314,445 B1 * 11/2001 Poole ........................ 718/1
6,385,764 B1 * 5/2002 Blandy et al. ............. 717/127

FOREIGN PATENT DOCUMENTS

WO    WO 9918486    4/1999

\* cited by examiner

*Primary Examiner*—Wei Zhen
*Assistant Examiner*—Philip Wang
(74) *Attorney, Agent, or Firm*—Michael E. Belk; Paul Im (57) ABSTRACT

A system and method for processing virtual machine instructions which supports the software trap methodology. An application programming interface (API) prescribes additional functionality for software traps that remove the processing of recursive virtual machine instructions from virtual machine hardware and instead process recursive virtual machine instructions using software. The additional functionality includes the configuration of a context for processing recursive virtual machine instructions, which enables the virtual machine instructions to access CPU registers to retrieve and modify the values of variables as required, the release of the configured context when processing of recursive virtual machine instructions is completed, and the return of control to a virtual machine for processing non-recursive virtual machine instructions.

12 Claims, 4 Drawing Sheets

SOFTWARE SUPPORT FOR VIRTUAL MACHINE INTERPRETER (VMI) ACCELERATION HARDWARE

FIELD OF THE INVENTION

The present invention relates generally to computer programming languages, and more particularly to the translation and execution of a virtual machine language.

BACKGROUND OF THE INVENTION

Computer programming languages are used to create applications consisting of human-readable source code that represents instructions for a computer to perform. Before a computer can follow the instructions however, the source code must be translated into computer-readable binary machine code.

A programming language such as C, C++, or COBOL typically uses a compiler to generate assembly language from the source code, and then to translate the assembly language into machine language which is converted to machine code. Thus, the final translation of the source code occurs before runtime. Different computers require different machine languages, so a program written in C++ for example, can only run on the specific hardware platform for which the program was written.

Interpreted programming languages are designed to create applications with source code that will run on multiple hardware platforms. Java™ is an interpreted programming language that accomplishes platform independence by generating source code that is converted before runtime to an intermediate language known as "bytecode" or "virtual machine language." At runtime, the bytecode is translated into platform-appropriate machine code via interpreter software, as disclosed in U.S. Pat. No. 4,443,865. To interpret each bytecode, interpreter software performs a "fetch, decode, and dispatch" (FDD) series of operations. For each bytecode instruction the interpreter software contains a corresponding execution program expressed in native central processing unit (CPU) instructions. The interpreter software causes the CPU to fetch or read a virtual machine instruction from memory, to decode the CPU address of the execution program for the bytecode instruction, and to dispatch by transferring control of the CPU to that execution program. The interpretation process can be time-consuming.

As disclosed in PCT Patent Application No. WO9918484 adding a preprocessor (a virtual machine interpreter (VMI)) between a memory and a CPU improves the processing of virtual machine instructions. In essence, the virtual machine is not a physical structure, but rather is a self-contained operating environment that interprets bytecode for the hardware platform by selecting the corresponding native machine language instructions that are stored within the VM or in the CPU. The native instructions are then supplied to and consecutively executed in the CPU of the hardware platform. A typical virtual machine requires 20–60 cycles of processing time per bytecode (depending on the quality and complexity of the bytecode) to perform an FDD series of operations.

Further reductions in processing time can be achieved by implementing a hardware accelerator as disclosed in PCT Patent Application Nos. WO9918484 and WO9918486. First, a VMI reads (fetches) a bytecode from memory. Next, the VMI looks up a number of properties of (decodes) the fetched bytecode. One of the properties accessed by the VMI indicates whether the bytecode is simple or complex, which determines whether the VMI can translate the bytecode in hardware. The VMI translates simple Java™ bytecodes into a specialized and optimized sequence of native CPU instructions, which are then fetched and executed by the CPU. While the CPU is executing an instruction, the VMI fetches and translates the next bytecode into CPU instructions. The VMI can process simple bytecodes in 1–4 cycles. If its properties indicate that a bytecode is complex, the VMI generates a generic sequence of native CPU instructions, thereby implementing a "software trap" that directs the complex bytecode to software for interpretation and execution. Upon encountering a complex bytecode, a VMI issues machine code instructions to the CPU that cause the execution of the corresponding native function, i.e. a machine code subroutine residing in the CPU. In response, the CPU interrupts the execution of native instructions generated by the VMI as a result of previous bytecode translations and executes the native function called for by the complex bytecode. The VMI waits to detect renewed fetching from its output buffer and then resumes translation of the sequence of bytecodes. Although it accesses existing native functions rather than translating complex bytecodes instruction by instruction, the VMI reduces the effect of FDD time to almost 0 cycles, because VMI processing of each software trap (5–20 cycles) occurs concurrently with CPU execution of another bytecode.

While interpreting a sequence of bytecodes, a virtual machine may encounter a complex bytecode that is "recursive." A challenge arises in executing recursive bytecodes (RBCs) because each RBC calls for a native function that eventually results in a method call (i.e., the VMI is reactivated for another sequence of Java bytecodes). Thus, to decode the bytecodes from the other sequence, the native function called for by the RBC must access the values of variables stored in CPU registers. Native functions commonly (but do not always) include standard sets of instructions, hereinafter referred to as "preambles" and "postambles." The standard preamble is designed to save the content of some or all CPU registers before a subroutine is executed. Some of the content that is saved concerns the values of variables (such as a stack pointer and the return address for reactivating the virtual machine) that may need to be modified during the execution of the native function. However, these variables will not normally be accessible within the native function intended by the RBC because the RBC method call is defined in source code of the programming language, rather than in the machine code that is required to access CPU registers. Furthermore, because the RBC method call cannot access the CPU registers, the standard subroutine postamble cannot write the value of variables that have been modified by the RBC method call back into the CPU registers. In other words, the subroutine called for by a recursive bytecode may not be executed properly because the RBC subroutine cannot access variables stored in CPU registers, either due to a lack of context-setting (no preamble or postambles) or due to an association of incompatible context-setting with the native function called. It is possible to address this challenge by implementing hand-coded software that generates assembly language to write and modify the values of variables for RBC subroutines, however this approach requires a complicated development effort.

There is a need for a system of interpreting programming languages that accurately and efficiently executes instructions intended by recursive bytecodes, while having greater ease of implementation.

SUMMARY OF THE INVENTION

The present invention fulfills the needs described above by prescribing a special function that supplies a preamble and postamble for and executes the native functions called for by a recursive bytecode. The preamble and postamble override or modify any standard preambles and postambles associated with the native functions, and enable the native functions to access and modify the content of necessary CPU registers. In alternative embodiments, special functions can be fetched from processor memory or generated for any complex bytecode. The present invention thereby maintains the accuracy and speed while simplifying the implementation of the software trap or "VMI acceleration hardware" methodology.

More specifically, the present invention provides VMI support in the form of an application programming interface (API). When a VMI encounters a recursive bytecode while interpreting and executing a sequence of bytecodes, the VMI support software of the present invention encapsulates the top-level subroutine called for by the recursive bytecode with an additional preamble and an additional postamble. The additional preamble of the present invention manipulates the values of variables that are contained in CPU registers when the subroutine is called, thereby causing the CPU to write these values into variables that are accessible within the called subroutine. In this manner, the called subroutine can modify the values of the variables. Executed after the standard subroutine postamble, the additional postamble of the present invention causes the CPU to fetch the values of modified variables and to write the values into CPU registers. Accordingly, the modified variables will be available when the CPU resumes the execution of native instructions that result from subsequent bytecode translations.

Briefly, the present invention includes methods and systems for processing virtual machine instructions, which in the exemplary embodiment of the present invention are generated by the Java™ programming language. At the programming level, Java™ source code is compiled into an intermediate language called bytecode. Bytecode consists of virtual machine instructions that can be interpreted by a virtual machine for execution by a processor. According to the exemplary embodiment of the present invention, at runtime a virtual machine (in the exemplary embodiment, a VMI) is initialized. A table is compiled that includes entry addresses for all software traps, where the software traps remove the processing of certain complex bytecodes from VM hardware and instead process complex bytecodes using software. Parameters are initialized which categorize bytecodes according to the appropriate processing methodology for the characteristics of each bytecode. For example, bytecodes may be characterized as simple, complex, or recursive (RBC). A recursive bytecode is a virtual machine instruction in a first sequence of bytecodes that invokes a subroutine that may execute one or more bytecodes in a second sequence of bytecodes and then returns to the first sequence of bytecodes. Examples of recursive Java bytecodes are INVOKESTATIC and NEW. Those software traps that are configured to process RBCs are furnished with appropriate preambles and postambles.

The VMI proceeds to translate each of a series of bytecodes into one or more native instructions. When an RBC is encountered, the VMI suspends the translation of the sequence of bytecodes and processes the RBC via the appropriate software trap. Generally, the software trap retrieves the native function(s) that correspond to the virtual machine instructions of the RBC. The application programming interface (API) of the present invention prescribes an appropriate subroutine that executes a preamble, calls the native function corresponding to the RMC, and executes a postamble. The preamble is executed before execution of the native function(s) called for by the RBC. The postamble is executed after execution of the native function(s) called for by the RBC, and after any RETURN statement in the RBC native function(s). If the subroutine called for by the RBC contains a standard preamble and/or a standard postamble, then the preamble of the present invention overrides and is typically executed before executing the standard preamble, and the postamble of the present invention overrides and is typically executed after execution of the standard postamble. Alternatively, the preamble and postamble of the present invention may physically modify or overwrite one or more instructions contained in a standard preamble or a standard postamble, respectively. According to an aspect of the exemplary embodiment of the present invention the preamble writes values to variables that are accessible to the subroutine called for by the RBC. The postamble of the present invention writes the values of variables that were modified by the called subroutine back to the CPU registers that contain the variables. The subroutine prescribed by the API then initiates the resumption of translation in the VMI of the sequence of bytecodes, which will continue until another RBC is encountered or the translation process otherwise terminates. Alternatively, the subroutine prescribed by the API may execute preambles and postambles as needed to give native operations access to the VMI context—for example, a first preamble before native processing begins, a first postamble before the method is processed, another preamble after the execution of the method, and a final postamble after native processing is complete.

VMI translation is resumed using code such as a C RETURN statement. In the exemplary embodiment of the present invention however, the C RETURN statement that is issued by an RBC is augmented by a resumption subroutine that releases the areas of the CPU configured as an environment for processing the RBC and returns VMI execution to a position in the sequence of bytecodes, for example to the position immediately following the most recently translated RBC.

Another aspect of the present invention is the system for executing virtual machine instructions from an interpreted language such as Java™. The system includes a processor (the CPU) and a preprocessor (the VMI), an instruction memory, a translator (a JVM), and an application programming interface (the API). The processor contains and is configured to execute hardware-specific instructions, hereinafter referred to as native instructions. The preprocessor is a virtual machine, for example a VMI, configured to fetch bytecode from the instruction memory and to translate the bytecode into native CPU instructions. For certain types of bytecode, the API is configured to write values from CPU registers into variables such that the variables are accessible to the native CPU instructions represented by the bytecode, and to modify the values of the variables according to the native CPU instructions represented by the bytecode. In the exemplary embodiment of the present invention, the API prescribes a subroutine that implements a preamble before and a postamble after execution of the subroutine called for by the bytecode. The preamble writes values from CPU registers to variables accessible to the called subroutine. After executing the instructions represented by the bytecode, the API modifies the values of the variables accordingly by executing a postamble subroutine.

Although it is possible to implement software trap methodology combined with the API of the present invention to process various types of bytecode, the exemplary embodiment of the present invention is directed to the processing of recursive bytecodes.

The present invention can be implemented in systems that execute Java™ bytecode using virtual machines, such as JVMs made by Sun Microsystems. However, the invention can also be implemented using other Java™ virtual machines such as the Microsoft Virtual Machine, and is also applicable to systems that execute other interpreted languages such as Visual Basic, dBASE, BASIC, and MSIL (Microsoft Intermediate Language).

Additional objects, advantages and novel features of the invention will be set forth in part in the description which follows, and in part will become more apparent to those skilled in the art upon examination of the following, or may be learned by practice of the invention.

DESCRIPTION OF PREFERRED EMBODIMENTS

Figure 1:
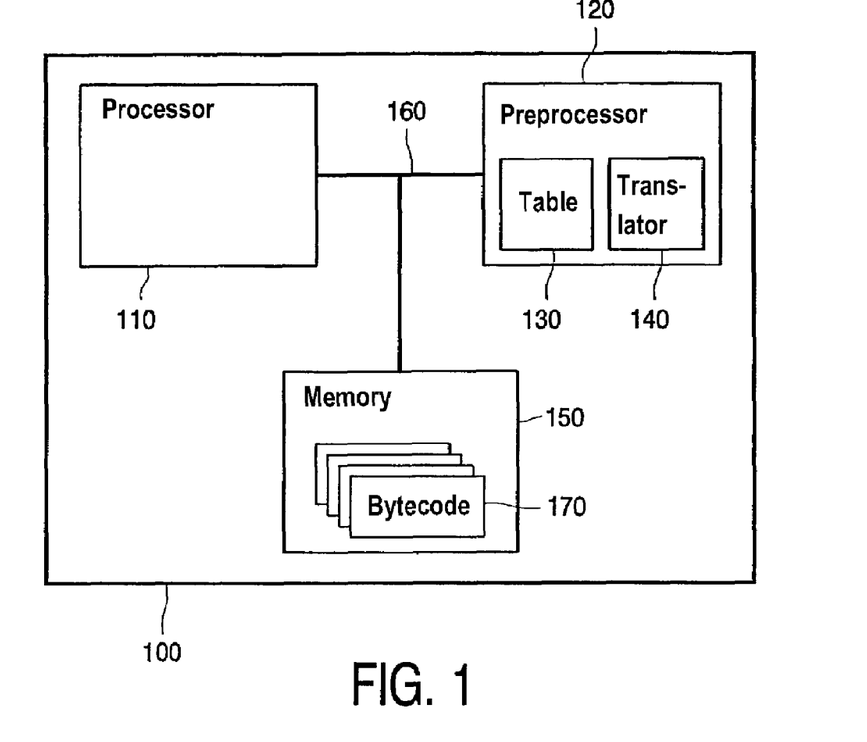
FIG. 1 is a block diagram that shows the functional elements of an exemplary embodiment of the environment of the present invention.

Referring now in detail to an exemplary embodiment of the present invention, which is illustrated in the accompanying drawings, in which like numerals designate like components, FIG. 1 is a block diagram of the exemplary embodiment of the environment of the present invention. The basic components of the environment are a hardware platform 100 which includes a processor 110, a preprocessor 120, and an instruction memory 150 which are all connected by a system bus 160. The preprocessor 120 includes at least one table 130 and a translator 140. A hardware platform 100 typically includes a central processing unit (CPU), basic peripherals, and an operating system (OS). The processor 110 of the present invention is a CPU such as MIPS, ARM, Intel™ x86, PowerPC™, or SPARC type microprocessors, and contains and is configured to execute hardware-specific instructions, hereinafter referred to as native instructions.. In the exemplary embodiment of the present invention, the translator 140 is a Java™ virtual machine (JVM), such as the KVM by Sun Microsystems. The preprocessor 120 in the exemplary embodiment is preferably the Virtual Machine Interpreter (VMI) disclosed in WO9918486, and is configured to fetch bytecode from the instruction memory and to translate the bytecode into native CPU instructions. The VMI 120 is a peripheral on the bus 160, and may act as a memory-mapped peripheral, where a predetermined range of CPU addresses is allocated to the VMI 120. The VMI 120 manages an independent virtual machine instruction pointer indicating the current (or next) virtual machine instruction in the instruction memory 150. The instruction memory 150 contains virtual machine instructions, for example, Java™ bytecode 170.

Figure 2:
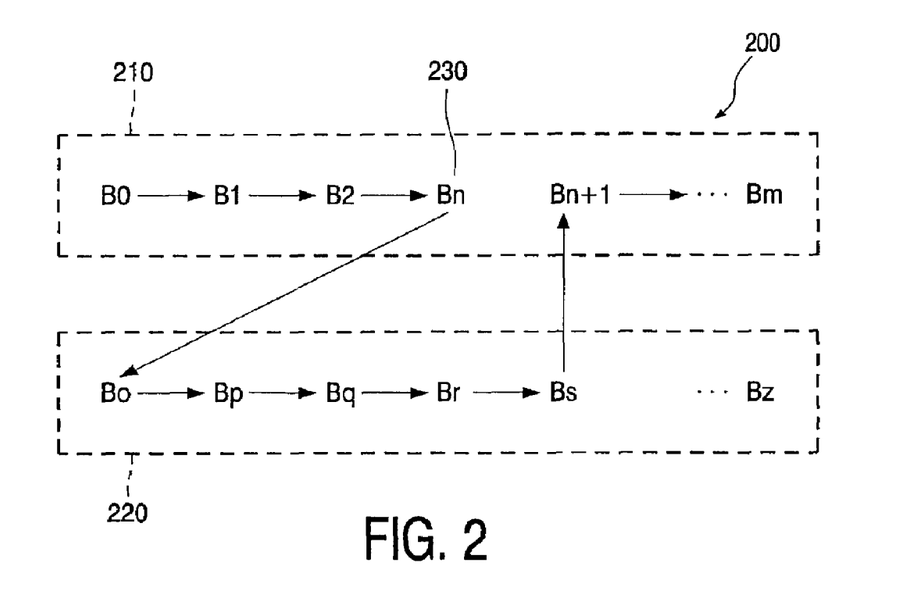
FIG. 2 illustrates an exemplary bytecode processing sequence.

The VMI 120 accelerates the interpretation of Java™ bytecode 170, by translating most bytecodes 170 into optimal sequences of native CPU instructions. However, the VMI 120 implements a software solution for processing complex bytecodes 170, by executing a software trap. The present invention is generally directed to systems and methods for augmenting the execution of software traps that target a specific type of complex bytecode, known as a recursive bytecode (RBC) 230. FIG. 2 illustrates the definitive characteristic of an RBC 230, which is that processing of an RBC 230 in a first series 210 of bytecodes 170 causes the processing of bytecodes 170 in a second series 220 of bytecodes 170 and a subsequent return to processing of bytecodes 170 in series 210. Thus, the execution of an RBC 230 results in a bytecode subroutine known as a "method". Note that if series 210 is equal to series 220, then series 210 constitutes a "recursive method," a term which is not equivalent to "recursive bytecode." The present invention supports the general operation of software traps that process RBCs 230, by defining an API that contains a prescription of the general structure of the software traps.

Figure 3:
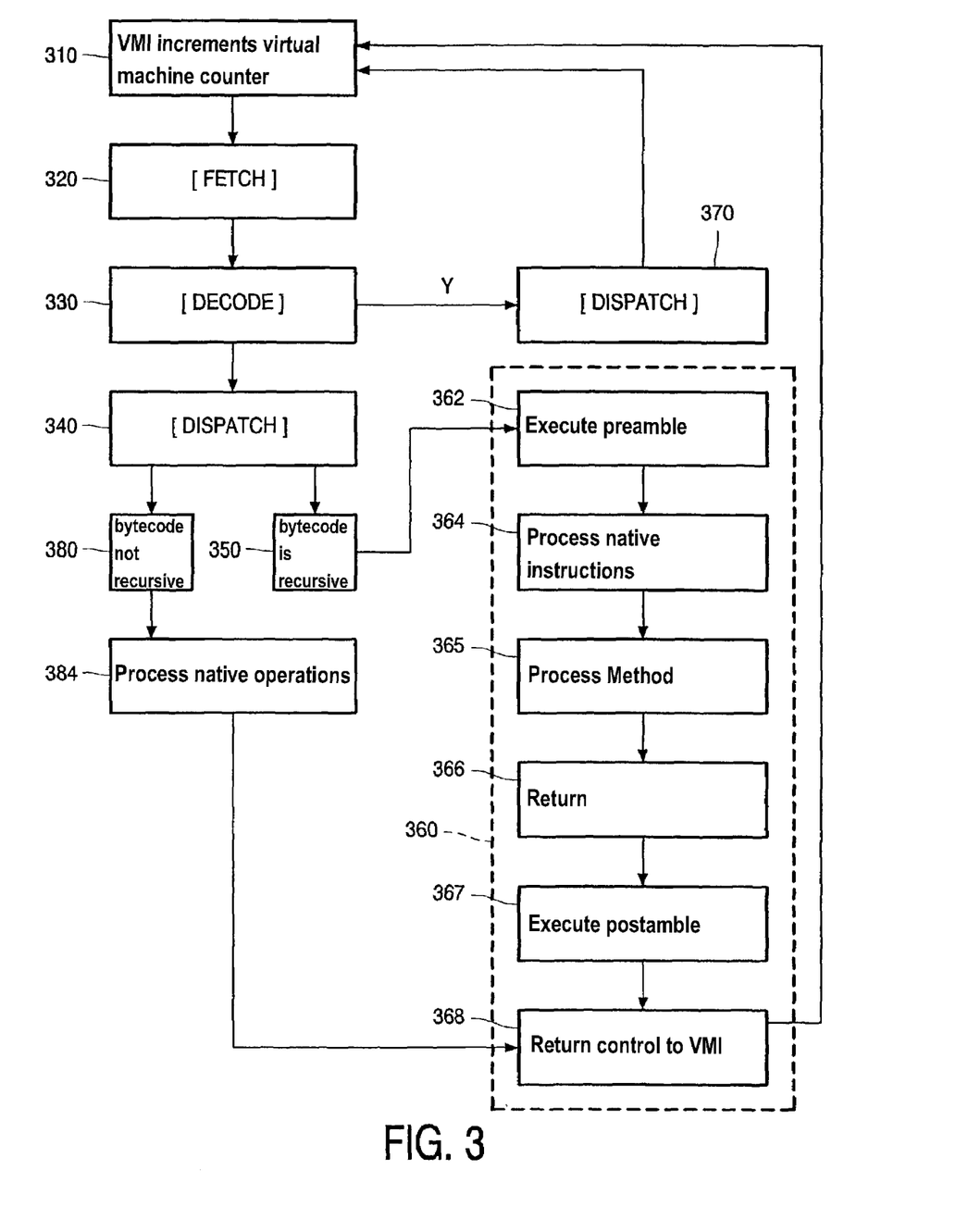
FIG. 3 is a flow chart of a method according to an exemplary embodiment of the present invention.

According to the present invention and referring now to FIG. 3, at runtime a VMI 120 is initialized, a process which includes setting the translation control registers of the VMI 120. A table 130 is compiled that includes entry addresses for all software traps. Parameters are initialized which enable the VMI to process each bytecode according to the properties of the bytecode. When the bytecode is complex, the VMI processes the bytecode via the appropriate software trap. According to the present invention, those software traps that are configured to process RBCs 230 are directed to the appropriate preambles and postambles, as part of the generic sequence of native instructions that together form the software trap. The preambles and postambles may be generated by the VMI 120, but in the exemplary embodiment are stored in, instantiated in, and executed from processor memory. Alternatively, the preambles and postambles could be stored in tables 130 within the VMI. Thus in the API implementation, upon system initialization each RBC software trap entry point is programmed to point to a native subroutine (a "PPA subroutine"). The PPA subroutine includes the execution of a preamble and a postamble, and has been instantiated to contain jumps to the native function (s) called for by the RBC.

As an example of the operation of the present invention, the VMI 120 proceeds to translate each of a series 210 of bytecodes 170 into one or more native instructions. Referring now to FIG. 2, bytecodes B0 through B2 are non-recursive, so the VMI 120 simply fetches B0 through B2 from the instruction memory 150, selects the native instruction or instructions defined for each bytecode 170, and supplies the instruction(s) to the processor 110 for execution. Bn is an RBC 230 the execution of which may result in the execution of one or more bytecodes (here, Bo through Bs) from a second sequence 220. Note that in Java, method calls always enter a sequence at the first bytecode, however there is no technical reason that other languages would not allow entry at other positions along an instruction sequence. After execution of bytecodes in the second sequence 220, Bs is a RETURN bytecode that causes bytecode execution to continue somewhere in the first sequence 210. A Java method can have several exit points (RETURN bytecodes), as indicated by Bs not being the last bytecode of sequence

220. After Bs, execution typically continues in the first sequence 210 at Bn+1, but this does not necessarily have to be the case.

As shown in block 310 of FIG. 3, the VMI 120 increments a virtual machine counter before proceeding in block 320 to fetch each bytecode 170. In block 330, the VMI 120 decodes the bytecode 170, by determining from the properties of the bytecode 170 whether the bytecode 170 is "simple"—that is, whether there is a hardware translation consisting of at least one native instruction for the bytecode 170. If there is an existing hardware translation for the bytecode 170, the method proceeds to block 370 and processes the simple bytecode accordingly. If there is no hardware translation existing for the bytecode 170, then the bytecode 170 is complex. In block 340, the VMI tests the bytecode 170 against the parameters in the table 130 that identify the appropriate generic sequence of native instructions for the complex bytecode. The VMI 120 suspends the translation of the sequence 210 of bytecodes 170 and processes the complex bytecode according to this generic sequence which makes up the appropriate software trap, the address of which is located in the table 130. A software trap typically processes a complex bytecode by retrieving the native function that corresponds to the bytecode 170 and dispatching the native function to the CPU 110, rather than by interpreting the subroutine represented by the bytecode 170 instruction by instruction. The application programming interface (API) of the present invention is a specification that prescribes the functionality needed to augment the software trap methodology as implemented to process RBCs, and that prescribes how the functionality is accessed. If the bytecode 170 is not recursive as is assumed in block 380, according to the appropriate software trap as identified in block 340, the native operations are processed in block 384 until control is returned to the VMI as in block 368. If the bytecode 170 is recursive as is assumed in block 350 the API of the present invention prescribes an appropriate PPA subroutine 360 that configures the environment for an RBC 230 so that the native function represented by RBC 230 can access registers in the CPU 110 that contain values of variables that are necessary to the execution of the subroutine. The necessary variables may include pointers to the constant pool, stack, locals, and program code. The PPA subroutine 360 prescribed by the API executes a preamble in block 362 before the CPU begins processing native operations corresponding to the RBC 230 in block 364. Native processing continues until a native context access function is encountered in block 364, causing the reactivation of the VMI. The VMI's parameters are changed for processing the method 220 in block 365 until a RETURN bytecode causes the resumption of any remaining native processing (block 366). Encountering another RETURN bytecode during native processing shifts control back to the PPA subroutine to which executes a postamble in block 367, and in block 366 control is returned to the VMI for processing according to new parameters after execution of the PPA subroutine 360 is complete. The address of the appropriate PPA subroutine 360 is stored in the table 30, and corresponds to the software trap that is configured to process bytecodes 170 that are recursive. The preamble is executed before execution of the native operations (native processing) called for by the RBC 230. If a standard preamble is associated with the native function called for by the RBC 230, the preamble of the present invention is executed so as to either override or modify the standard preamble associated with the native function. The postamble is executed after execution of the native function called for by the RBC 230. Similarly, the postamble of the present invention is executed so as to either override or modify a standard postamble associated with the native function called for by the RBC (if there is a standard postamble), and after the C RETURN statement in the RBC native function.

According to an aspect of the exemplary embodiment of the present invention the preamble writes values to variables that represent certain vital pointers such as the stack pointer, thereby making the pointers accessible to the native function called for by the RBC 230. For example, to provide access to the context of the native function called for by the RBC 230, several functions are defined:

void* vmi_bcc(void* jfp);
    void* vmi_object(void* jfp);
    void* vmi_jsp(void* jfp);
    void* vmi_cpd(void* jfp);
    void* vmi_cpt(void* jfp);
    void* vmi_bcc(void* jfp);

Similarly, the following functions give access to the constant pool:

<t> vmi_cpdEntry(void* jfp, unsigned n, <t>)
    unsigned char vmi_cptEntry(void* jfp, unsigned n)

The following functions give access to the current and next bytecode 170:

unsigned char vmi_bc(void* jfp, n)
    unsigned char vmi_shortpar(void* jfp, n)
    unsigned char vmi_3bytePar(void* jfp, n)
    unsigned char vmi_wordPar(void* jfp, n)

The following function is used to access the Java™ stack:

<t> vmi_stkEntry(void* jfp, n, <t>)

Figure 4:
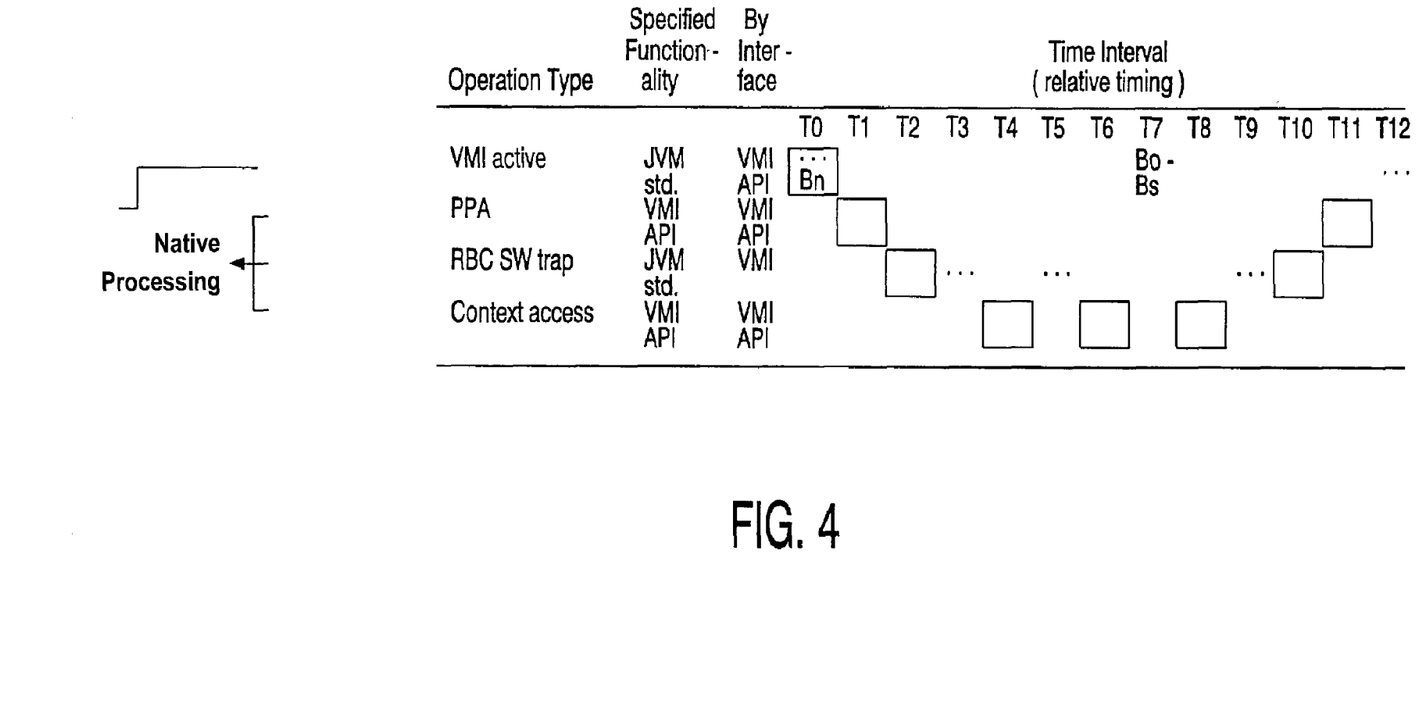
FIG. 4 is a timeline illustrating the relative timing of the operations involved in the exemplary embodiment of the present invention.
Figure 5:
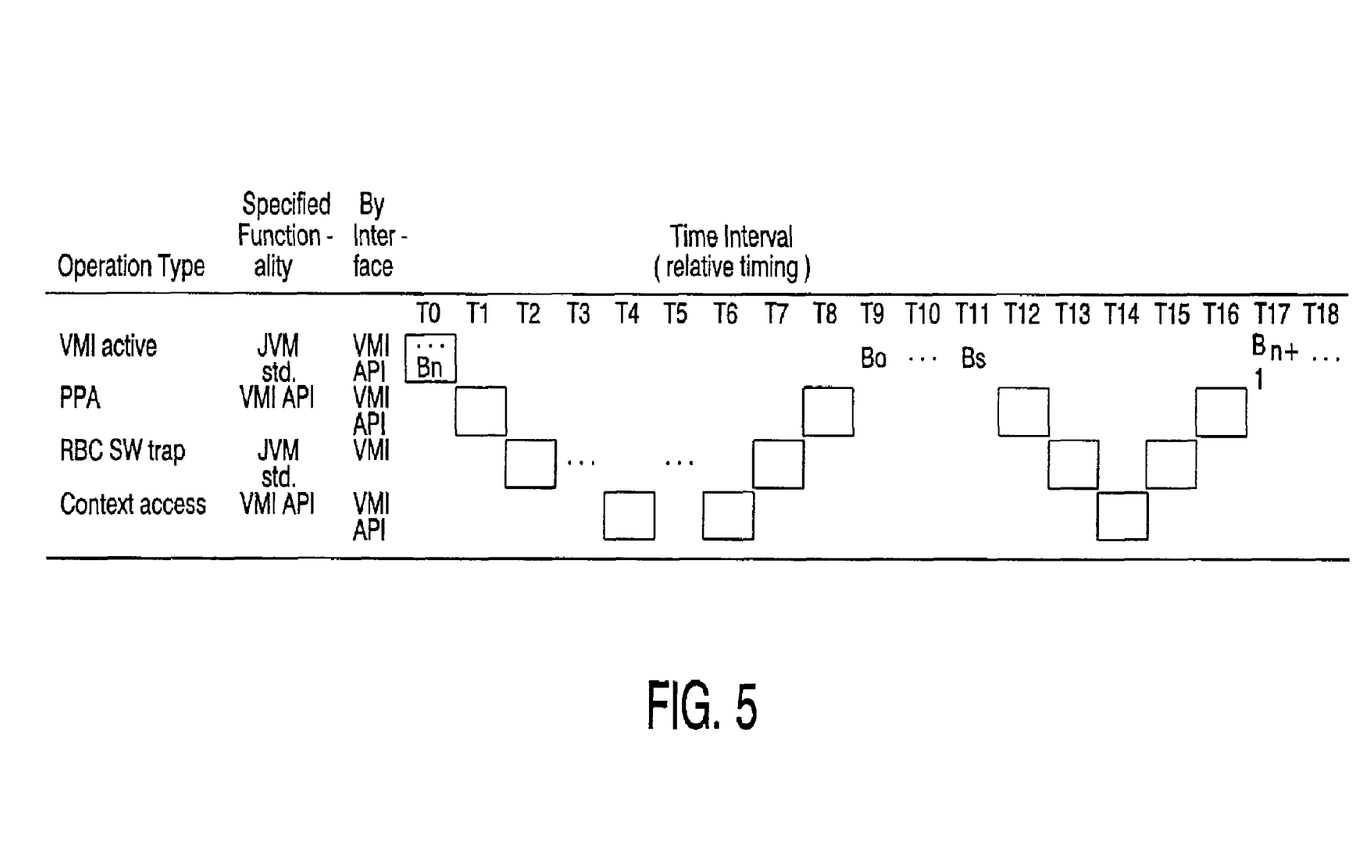
FIG. 5 is a timeline illustrating the relative timing of the operation involved in another exemplary embodiment of the present invention.

Referring now to FIG. 4, the VMI's active translation (Java bytecode processing) functionality is prescribed by the Java Virtual Machine (JVM) standard. FIG. 4 represents a hypothetical bytecode processing timeline, where the intervals T0–T12 represent arbitrary periods of time that are not necessarily equal. During interval T0 the VMI translates bytecodes 170 using the API of the present invention as an interface until a recursive bytecode (RBC) 230 is encountered. Cross-referencing the hypothetical diagram in FIG. 2, the VMI processes bytecodes B0 through B2 and then encounters Bn. The RBC 230 (Bn) causes control to be passed to native processing in interval T1, when the appropriate RBC software trap (as indicated by the API) is identified and the corresponding PPA subroutine is executed. In intervals T2 through T10, the software trap executes the native functions called for by the RBC 230, accessing (in interval T4) the context initialized by the preamble. The processing cycle (native operations specific to the RBC 230 and calls to context-accessing functions) of intervals T3 and T4 is repeated as needed, for example, in intervals T5 and T6. The native function eventually (possible after thousands of natively executed cycles) results in a native context access function which reactivates the VMI in interval T7. The VMI actively processes the bytecodes for the newly called method (hypothetical bytecodes Bo through Br) until a RETURN bytecode (Bs) is encountered in interval T7, which returns control back to the native function processing. In interval T8, control is returned from the VMI 120 to native processing implicitly either by the VMI 120 hardware or by software (via the API and accomplished via code such as a C programming language RETURN statement). Native processing continues through interval T10, when another C RETURN statement transfers control to the PPA subroutine so that the postamble is executed in interval T11. The postamble of the present invention writes the values of variables that were modified by the RBC subroutine back into the CPU registers that contain the variables, before control is again returned to the VMI 120 (at hypothetical bytecode Bn+1) in time interval T12. According to the alternative embodiment shown in FIG. 5, preambles and postambles may be executed so as to effectuate context changes needed to process the newly called method (exemplary bytecodes Bo through Bs)—for example, the first preamble before native processing begins in interval T1, the first postamble before the method is processed in T9 through T11, another preamble in interval T12 after the execution of the method, and a final postamble in interval T16 after native processing is complete.

Referring again to FIG. 3, in block 368 the PPA subroutine 360 prescribed by the API is also configured to initiate the resumption of translation in the VMI 120 of the sequence 210 of bytecodes 170. Control is returned from the VMI 120 to native processing implicitly, either by the VMI 120 or via the API implementation and thus are implemented either in hardware or in software. Software implementations of this resumption routine are accomplished via code such as a C programming language RETURN statement, which is ordinarily included in a native function. After return from native processing, the context is destroyed, for example by "vmi_freeFrame" so that control can be passed back to the VMI 120 . Destruction of the context releases the areas of the CPU 110 configured as an environment for processing the RBC 230 and returns VMI 120 translation to a position in the sequence 210 of bytecodes 170, for example (but not necessarily) to the position immediately following the most recently translated RBC 230.

When control is returned to the VMI 120 in block 310, the virtual machine counter is incremented and the VMI 120 fetches the next bytecode 170. Thus, translation by the VMI 120 will continue until another RBC 230 is encountered or the translation process otherwise terminates (e.g., the VMI encounters another complex bytecode, or runs out of bytecodes to process).

In view of the foregoing, it will be appreciated that the present invention provides a system and a method for supporting the software trap approach for processing virtual machine instructions, so as to ease the implementation of a method for accurate and efficient processing recursive virtual machine instructions. Still, it should be understood that the foregoing relates only to the exemplary embodiments of the present invention, and that numerous changes may be made thereto without departing from the spirit and scope of the invention as defined by the following claims.

The invention claimed is:

1. A method of processng virtual machine instructions comprising:

initializing parameters to identify a subset of the virtual machine instructions having a particular set of characteristics;

translating a range of the virtual machine instructions to native instructions executable by a processor, until a member of said identified subset of the virtual machine instructions is encountered;

upon encountering a member of said identified subset of the virtual machine instructions, suspending the translation of the range of virtual machine instructions;

implementing an interface, where said interface prescribes a set of native processor subroutine instructions that:

executes a preamble that causes the processor to write values to variables that are accessible by the subroutine before executing the native processor subroutine instructions represented by said member of said identified subset of the virtual machine instructions;

retrieves native functions from the processor that correspond to the native processor subroutine instructions represented by said member of said identified subset of the virtual machine instructions;

executes the retrieved native instructions;

executes a postamble that causes the processor to fetch values of variables that are modified by the executed native instructions and write the fetched values into processor registers after executing the native processor subroutine instructions represented by said member of said identified subset of the virtual machine instructions; and resumes the translation in the virtual machine of the range of the virtual machine instructions, where execution continues until another member of said identified subset of the virtual machine instructions is encountered; and executing said set of native processor instructions.

2. The method of claim 1, further comprising:

executing a postamble before executing retrieved native instructions that constitute a method, where said postamble comprises native instructions that modify the values of variables in registers in the processor so as to effectuate context changes needed to execute the method; and executing a preamble after executing retrieved native instructions that constitute a method, where said preamble comprises native instructions that write values from registers in the processor to variables that are accessible to the native instructions executed after the method has been executed.

3. The method of claim 1, wherein said preamble and said postamble are generated by the virtual machine.

4. The method of claim 1, wherein said preamble and said postamble are retrieved from processor memory.

5. The method of claim 1, wherein said preamble comprises native instructions that write values from registers in the processor to variables that are accessible to the instructions represented by said identified subset of the virtual machine instructions.

6. The method of claim 1, wherein said postamble comprises native instructions that modify the values of variables in registers in the processor according to the instructions represented by said identified subset of the virtual machine instructions into registers in the processor.

7. The method of claim 1, wherein said preamble and said postamble override instructions associated with said member of said identified subset of the virtual machine instructions that conflict with said preamble and said postamble.

8. The method of claim 1, wherein said preamble and said postamble modify instructions associated with said member of said identified subset of the virtual machine instructions that conflict with said preamble and said postamble.

9. The method of claim 1, further comprising initiating a resumption subroutine, wherein said resumption subroutine comprises:

releasing the registers in the processor that were accessed by the preamble and postamble; and directing the virtual machine to resume translation at a position in the range of virtual machine instructions.

10. A method of processing virtual machine instructions comprising:

configuring an environment in a central processing unit;

implementing an interface that prescribes a set of native processor instructions, said set of native processor instructions comprising:

executing a preamble that causes values to be written to variables that are accessible by the configured environment before executing the native processor instructions represented by the virtual machine instructions;

retrieving native functions from the processor that correspond to the instructions represented by the virtual machine instructions;

executing the retrieved native instructions;

executing a postamble that causes values of variables that are modified by the executed native instructions to be fetched and written to registers that are accessible outside the configured environment after executing the native instructions represented the virtual machine instructions; and releasing the configured environment; and executing said set of native processor instructions.

11. An apparatus for processing virtual machine instructions comprising;

a processor having a native instruction set and configured to execute native instructions;

an instruction memory, configured to store virtual machine instructions;

a preprocessor, where the preprocessor is a virtual machine configured to fetch virtual machine instructions from the instruction memory and configured to translate fetched virtual machine instructions into native instructions executable by the processor; and an interface between the instruction memory and the processor configured to initiate a subroutine that writes register values of variables in the processor unit that are accessible to the instructions represented by the virtual machine instructions, issues a native subroutine call that corresponds to the instructions represented by the virtual machine instructions, modifies the values of said variables according to the virtual machine instructions, and returns control to the preprocessor.

12. A method for executing a native processor subroutine called for by virtual machine instructions, comprising:

executing a preamble set of native instructions before executing the called subroutine, where said preamble is configured to write values from registers in the processor to variables that are accessible to the called subroutine; and executing a postamble set of native instructions after executing the called subroutine, where said postamble is configured to modify the values of variables in registers in the processor according to the called subroutine.

* * * * *